United States Patent [19]

Bray et al.

[11] Patent Number: 5,749,042
[45] Date of Patent: May 5, 1998

[54] BISMUTH GENERATOR METHOD

[75] Inventors: Lane Allan Bray, Richland; Jaquetta R. DesChane, Pasco, both of Wash.

[73] Assignee: Battelle Memorial Institute, Richland, Wash.

[21] Appl. No.: 789,973

[22] Filed: Jan. 28, 1997

[51] Int. Cl.$^6$ .................................................. C01G 30/00
[52] U.S. Cl. ............................. 423/2; 423/249; 376/189; 210/682; 210/684
[58] Field of Search ..................... 423/2, 249; 210/682, 210/683, 684; 316/189

[56] References Cited

U.S. PATENT DOCUMENTS

| | | | |
|---|---|---|---|
| 3,758,663 | 9/1973 | Kirby | 423/2 |
| 4,018,561 | 4/1977 | Siemens et al. | 23/267 R |
| 4,663,129 | 5/1987 | Atcher et al. | 423/2 |
| 5,355,394 | 10/1994 | van Geel et al. | 376/189 |

*Primary Examiner*—Ngoclan Mai
*Attorney, Agent, or Firm*—Douglas E. McKinley, Jr.

[57] ABSTRACT

A method for separating $^{213}$Bi from a solution of radionuclides wherein the solution contains a concentration of the chloride ions and hydrogen ions adjusted to allow the formation of a chloride complex. The solution is then brought into contact with an anion exchange resin, whereupon $^{213}$Bi is absorbed from the solution and adhered onto the anion exchange resin in the chloride complex. Other non-absorbing radionuclides such as $^{225}$Ra, $^{225}$Ac, and $^{221}$Fr, along with HCl are removed from the anion exchange resin with a scrub solution. The $^{213}$Bi is removed from the anion exchange resin by washing the anion exchange resin with a stripping solution free of chloride ions and with a reduced hydrogen ion concentration which breaks the chloride anionic complex, releasing the $^{213}$Bi as a cation. In a preferred embodiment of the present invention, the anion exchange resin is provided as a thin membrane, allowing for extremely rapid adherence and stripping of the $^{213}$Bi. A preferred stripping solution for purification of $^{213}$Bi for use in medical applications includes sodium acetate, pH 5.5. A protein conjugated with bifunctional chelating agents in vivo with the NaOAc, to receive the $^{213}$Bi as it is being released from the anion exchange resin.

7 Claims, 2 Drawing Sheets

EXTRACT

WASH

STRIP

BISMUTH GENERATOR METHOD

This invention was made with Government support under Contract DE-AC06-76RLO 1830 awarded by the U.S. Department of Energy. The Government has certain rights in the invention.

FIELD OF THE INVENTION

The present invention relates generally to a method for purifying a solution of radionuclides or more specifically to a method for separation of $^{213}$Bi from a solution or mixture of radionuclides containing $^{225}$Ac, $^{225}$Ra, $^{213}$Bi and daughters therefrom.

BACKGROUND OF THE INVENTION

The widespread recognition of the use of radiation to kill or neutralize unwanted cell growth such as cancer has led to increasing interest in various species of radionuclides. Of particular interest are radionuclides, such as $^{213}$Bi, which emit alpha radiation, or alpha emitters, because the alpha radiation emitted by these radionuclides does not penetrate deeply into tissue. $^{213}$Bi is normally produced as a daughter product of $^{229}$Th ($t_{1/2}$=7,300 y). The radioactive decay chain in which $^{213}$Bi is found is well known: $^{233}$U ($t_{1/2}$=1.62×10$^5$ yr)→$^{229}$Th ($t_{1/2}$=7,300 yr)→$^{225}$Ra ($t_{1/2}$=14.8 day)→$^{225}$Ac ($t_{1/2}$=10 day)→$^{213}$Bi ($t_{1/2}$=46 min). The daughters of interest for biological applications include $^{225}$Ra ($t_{1/2}$=14.8 d) which decays to $^{225}$Ac ($t_{1/2}$=10.0 d). $^{225}$Ac in turn decays through a series of steps to $^{213}$Bi ($t_{1/2}$=46 min). Thus, a Bi generator can have as the starting material either $^{225}$Ac, separated from the parents, or a mixture of $^{225}$Ra/$^{225}$Ac. There are advantages and disadvantages to the use of $^{225}$Ra as a starting material. If $^{225}$Ra is not separated from the $^{225}$Ac, the amount of Ac in terms of available radioactivity as a function of time is greatly extended. However, if the $^{225}$Ra also contains a fraction of $^{224}$Ra, because the original thorium "cow" contained both $^{229}$Th and a small percent of $^{228}$Th/$^{224}$Ra, separation to remove the radium may be desirable. The daughters of $^{224}$Ra include $^{212}$Bi and $^{208}$Tl which may be undesirable from a patient biological perspective.

Briefly, by placing alpha emitters adjacent to unwanted cell growth, such as a tumor, the tumor may be exposed to the alpha radiation without undue exposure of surrounding healthy tissue. In many such schemes, the alpha emitter is placed adjacent to the tumor site by binding the alpha emitter to a chelator which is in turn bound to a monoclonal antibody which will seek out the tumor site within the body. Unfortunately, in many instances, the chelator will also bind to metals (Fe, Cr, RE's) other than the desired alpha emitter. Since a tumor may have a limited number of sites available for binding with the monoclonal antibody, it is desirable that the number of monoclonal antibodies bonded to metals other than the desired alpha emitter be minimized. Thus, it is desirable that the alpha emitter be highly purified from other metal cations. In addition, alpha emitters such as $^{213}$Bi ($t_{1/2}$=46 min) have very short half-lives. Thus, to utilize these short lived radionuclides effectively in medical applications, they must be efficiently separated from other metals or contaminants in a short period of time to maximize the amount of the alpha emitter available. A more detailed description of the use of such radionuclides is found in the articles "Alpha-emitting bullet targets leukemia cells", *Nuclear News*, June 1996, pp 47–48, (Dr. David Scheinberg, Memorial Sloan Kettering Cancer Center, New York, N.Y.); and Pippin, C. Greg, Otto A. Gansow, Martin W. Brechbiel, Luther Koch, R. Molinet, Jaques van Geel, C. Apostolidis, Maurits W. Geerlings, and David A. Scheinberg, 1995; "Recovery of Bi-213 from an Ac-225 Cow: Application to the Radiolabeling of Antibodies with Bi-213", *Chemists' Views of Imaging Centers*, Edited by A. M. Emran, Pleaum Press, New York, N.Y.

Various methods to separate bismuth from other radionuclides have been developed over the last few years. However, with the need for increasing amounts of alpha emitting radionuclides, it has been recognized that better generator designs are required (see Scheinberg). Recent work designed to develop Bi generators has focused on the use of an actinium-loaded organic cation exchange resin and is described in Pippin, C. Greg, Otto A. Gansow, Martin W. Brechbiel, Luther Koch, R. Molinet, Jaques van Geel, C. Apostolidis, Maurits W. Geerlings, and David A. Scheinberg, 1995, "Recovery of Bi-213 from an Ac-225 Cow: Application to the Radiolabeling of Antibodies with Bi-213", *Chemists' Views of Imaging Centers*, Edited by A. M. Emran, Pleaum Press, New York, N.Y.; Wu, C., M. W. Brechbiel, and O. A. Gansow, 1996, *An Improved Generator for the Production of Bi-213 from Ac-225*, American Chemical Society Meeting, Orlando, Fla., August, 1996; and Mirzadeh, Saed and Stephen J. Kennel, 1996, *Optimization of Radiolabeling of Immunoproteins with Bi-213*, American Chemical Society Meeting, Orlando, Fla., August, 1996.

The major problem with these organic cation exchange methods is that, with the need for larger amounts of "$^{225}$Ac cow" (1–20 mCi), the generator is limited by the early destruction of the actinium-loaded organic cation exchange resin, which is exposed to alpha radiation damage (usually for 20 days during its use). Attempts to minimize this destruction have been employed by Dr. Wu at the National Institute of Health (see Wu). Under this type of approach, the actinium is absorbed onto a small portion of the organic resin in a batch mode. The loaded ion exchange beads are then mixed with non-loaded beads to "dilute" the destructive effect, when placed in an ion exchange column used for Bi separation. Still, under this approach, the separation of the Bi from the organic resin requires at least two loading and elution steps resulting in a total separation time exceeding one hour.

Another inorganic ion exchange "generator" concept, has been developed by Gary Strathearn, Isotope Products Laboratories, Burbank, Calif. and is described in Ramirez Ana.R. and Gary E. Strathearn, 1996, *Generator System Development of Ra-223, Bi-212, and Bi-214 Therapeutic Alpha-Emitting Radionuclides*, American Chemical Society Meeting, Orlando, Fla., August, 1996. In this approach, inorganic polyfunctional cation exchangers are used to avoid damage from the intense alpha bombardment. A column of Alphasept-1™ is pretreated with nitric acid (HNO$_3$), the $^{225}$Ac in 1M HNO$_3$ feed is then loaded on to the column and the $^{213}$Bi product is eluted with 1M HNO$_3$. The product HNO$_3$ must then be evaporated to dryness to remove the nitric acid. It is then brought back into solution with a suitable buffered solution to prepare the final binding of the alpha emitter to a chelator and monoclonal antibody. The evaporation step extends the time required to prepare the final product and thus limits the usefulness of this approach. Thus, a need still exists for a method for rapid separation of high purity $^{213}$Bi from a solution or mixture of radionuclides containing $^{225}$Ac, $^{225}$Ra, $^{213}$Bi and daughters therefrom.

SUMMARY OF THE INVENTION

The present invention is thus a new $^{213}$Bi generator system. Several goals for this new generator system include resistance to the intense alpha bombardment from the $^{225}$Ac "cow", a high recovery of $^{213}$Bi with minimal ion exchange column breakthrough of $^{225}$Ac, minimization of the steps and time required to obtain the radiopharmaceutical, high purity of the $^{213}$Bi which can be easily and reproducibly linked to monoclonal antibody systems ("smart bullets"), and a system which can be easily handled by radiopharmacy technicians.

The present invention relies on the use of an organic anion exchange resin to adsorb $^{213}$Bi from an "$^{225}$Ac cow." Instead of storing the $^{225}$Ac on a cation resin for ~20 days as is common in prior art separation schemes during use and milking the $^{213}$Bi off of the cation resin, the "$^{225}$Ac cow" is stored in an acid solution and passed quickly through an anion exchange resin, preferably an anion exchange resin bond in a thin film or "web", to collect the $^{213}$Bi when needed. This greatly accelerates the separation and purification process and has been demonstrated to allow separation and purification of $^{213}$Bi in times of under 6 minutes. The ability to extract bismuth as an anion as a function of HCl concentration is well known and is described in Kraus, K. A. and F. Nelson, 1955, *Proceedings of the International Conference on the Peaceful Uses of Atomic Energy*, Nuclear Chemistry and the Effect of Irradiation, Vol. VII, P/837, "Adsorption of the elements from hydrochloric acid", held in Geneva, Aug. 8–20, 1955. Briefly, the distribution for the bismuth chloride complex anion in HCl increases with decreasing acid concentration, while the distribution for Fe increases with acid concentration. Other chelator interfering ions of interest, i.e., rare earths, radium (Ra), francium (Fr), and actinium (Ac) do not extract as chloride anions using anion exchange resin. Therefore, the use of the anion exchange resin allows $^{213}$Bi to be effectively removed from these and other interfering ions which do not extract as chloride anions using anion exchange resin.

Bismuth(III) is a cation in most solutions. However, when placed in a solution containing chloride ions (Cl⁻), Bi may, under the correct conditions, be absorbed from solution as an anionic complex. The efficiency of the absorption is dependent on the hydrogen ion concentration. Thus, according to the present invention, an $^{225}$Ac cow is first contained in a hydrochloric acid solution wherein the concentration of the chloride ions and the hydrogen ions are adjusted to levels which allow the formation of the chloride complex. Preferably, the HCl concentration is at a level which maximizes the absorption of the chloride complex, or between about 0.25M and about 1M, however, much higher concentrations do allow absorption, but at distribution levels below optimum. The cow solution is then brought into contact with an anion exchange resin, whereupon the daughter product of the $^{225}$Ac, $^{213}$Bi, is absorbed from the cow solution and adhered onto the anion exchange resin in the chloride complex. By using organic anion exchange resin, the bismuth extraction distribution ratio increases with decreasing acid concentration. As will be appreciated by those skilled in the art, a wide variety of anion exchange resins, including but not limited to Anex, manufactured by Sarasep Corp., Santa Clara, Calif., and Dowex-1, manufactured by Dow Chemical Company, are suitable for the practice of the present invention, the selection of the particular of the resin being dependant upon the needs or convenience of the particular user. As practiced by the present invention, the anion exchange resin is configured to allow rapid adherence and stripping of the $^{213}$Bi, thereby minimizing the time necessary for the separation and purification of the $^{213}$Bi. In a preferred embodiment of the present invention, the anion exchange resin is provided as a thin membrane, which allows the rapid adherence and stripping of the $^{213}$Bi.

Once the chloride complex containing the $^{213}$Bi is absorbed on the anion exchange resin, the resin may then be washed to remove traces of the "$^{225}$Ac cow" and acid from the anion exchange resin, leaving the anion exchange resin with purified $^{213}$Bi adhered as a chloride complex. Finally, the $^{213}$Bi is removed from the anion exchange resin by washing the anion exchange resin with a stripping solution. The stripping solution, free of chloride ions, and with a reduced hydrogen ion concentration in solution, breaks the chloride anionic complex and releases the $^{213}$Bi as a cation. Again, as will be recognized by those skilled in the art, a wide variety of stripping solutions are suitable for breaking the chloride complex and releasing the $^{213}$Bi. The selection of the stripping solution is thus made based upon considerations for further use of the $^{213}$Bi. In general, elution solutions having a pH in the neutral [pH 4–10] range, and more preferably a pH of greater than about 2, and which are substantially free of chloride ions are effective. Suitable stripping agents thus include water, complexants such as DTPA, and sodium acetate (NaOAc). By way of example, a preferred eluant for purification of $^{213}$Bi for use in medical applications may be a solution that will provide for the addition and linking of the $^{213}$Bi to a chelator and monoclonal antibody. The stripping solution may thus also contain the proteins conjugated with bifunctional chelating agents in vivo to receive the $^{213}$Bi as it is being released from the anion exchange resin, thereby shortening the total time for linking preparation before being received by the patient.

Objects

It is therefore an object of the present invention in one of its embodiments to provide a method for separating and purifying $^{213}$Bi from a solution of radionuclides.

It is a further object of the present invention in one of its embodiments to combine a solution containing radiochemical $^{225}$Ac and hydrochloric acid, with an anion exchange resin, whereupon the daughter product of the $^{225}$Ac, $^{213}$Bi, is absorbed the from the "cow" solution and adheres onto the anion exchange resin as a chloride complex.

It is a further object of the present invention in one of its embodiments to remove traces of the $^{225}$Ac cow and the acid from the anion exchange resin, leaving a chloride complex which adheres the $^{213}$Bi to the anion exchange resin.

It is a further object of the present invention in one of its embodiments to provide a stripping solution which weakens or destroys the chloride complex, thereby releasing the $^{213}$Bi from the anion exchange resin.

It is a further object of the present invention in one of its embodiments to provide the anion exchange resin in a configuration which minimizes the time necessary to absorb, wash, and strip the $^{213}$Bi from the anion exchange resin.

It is a further object of the present invention in one of its embodiments to provide the anion exchange resin as a thin membrane to minimize the time necessary to adhere and strip the $^{213}$Bi from the anion exchange resin.

It is a further object of the present invention in one of its embodiments to provide the stripping solution as a solution which will allow final preparation and attachment of a monoclonal antibody to the separated and purified $^{213}$Bi for patient treatment for leukemia or other forms of cancer.

It is a further object of the present invention in one of its embodiments to provide the stripping solution containing proteins conjugated with bifunctional chelating agents to receive the $^{213}$Bi as it is being released from the anion exchange resin to allow in vivo initiation of the linking process.

The subject matter of the present invention is particularly pointed out and distinctly claimed in the concluding portion of this specification. However, both the organization and method of operation, together with further advantages and objects thereof, may best be understood by reference to the following description taken in connection with accompanying drawings wherein like reference characters refer to like elements.

DESCRIPTION OF THE PREFERRED EMBODIMENT(S)

The process of the present invention is preferentially accomplished in a three step process; an extraction step, a wash step and a strip step.

In a preferred embodiment of the present invention, the Extraction step, as illustrated in FIG. 1a, 1b, 1c and 1d, is accomplished utilizing a cartridge holder 1 containing an organic anion exchange resin 2. As practiced in a preferred embodiment of the present invention, the resin 2 is configured as a thin "web" film, and is manufactured by 3M, St. Paul, Minn. The anionic exchange resin 2 is preferably selected as Anex™, which may be acquired from Sarasep Corp., Santa Clara, Calif. The resin 2 is first ground to a fine powder and is then secured in a PTFE (polytrifluoroethylene) "web" film in accordance with the method described in U.S. Pat. No. 5,071,610, incorporated herein by reference.

Figures 1A, 1B, 1C, 1D:
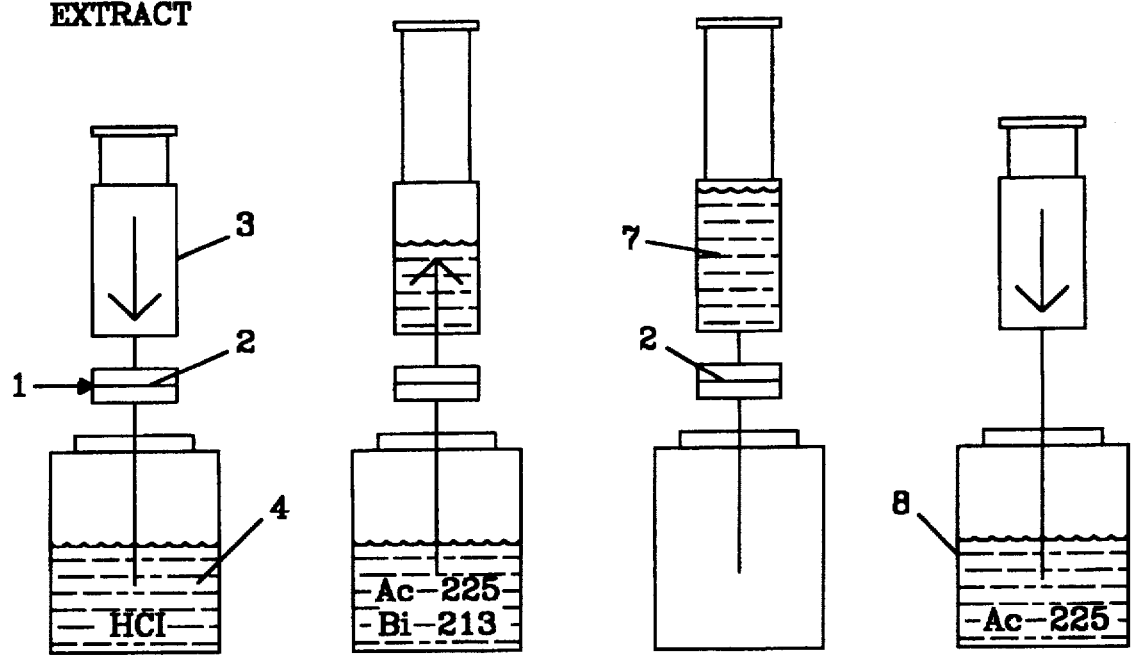
FIG. 1a illustrates the configuration of a thin film of an anionic exchange resin contained within a cartridge placed in-line with a syringe at the start of extraction of a solution containing $^{213}$Bi.
FIG. 1b illustrates the extraction of a solution containing $^{213}$Bi.
FIG. 1c illustrates the adherence of the $^{213}$Bi on the anionic exchange resin after extraction.
FIG. 1d illustrates the recovery of the $^{225}$Ac "cow" after extraction of the $^{213}$Bi.

The resin 2 in web form and cartridge 1 is placed in-line with a syringe 3. 0.5M HCl is first drawn through the cartridge 1 to wet the resin 2 and to assure that the resin 2 is in the chloride form. As will be apparent to those skilled in the art, both the cartridge size, the type of anion exchange resin used, and the chemistry of the "web" structure, can be varied depending on the amount of $^{213}$Bi to be produced. A sample of $^{225}$Ac is then provided in a solution of 0.5M HCl which forms a chloride complexed solution 4. Preferably, the $^{225}$Ac is first prepared by the method described in co-pending U.S. Patent Application entitled METHODS OF SEPARATING AND PURIFYING SHORT HALF-LIFE RADIONUCLIDES FROM A MIXTURE OF RADIONUCLIDES, Ser. No. 08/766,684, filed Dec. 13, 1996. As illustrated in FIG. 1b, and 1c, the $^{225}$Ac/$^{213}$Bi chloride complexed solution 4 is then drawn through the resin 2 whereupon the anionic $^{213}$Bi complex in the solution absorbs on the resin 2. As illustrated in FIG. 1c, the remaining solution 7 and $^{225}$Ac passes through the resin 2 and into the syringe. By removing the cartridge 1, the $^{225}$Ac may then be returned to the original "cow" container 8 as illustrated in FIG. 1d, for storage and future "in-growth of $^{213}$Bi.

Figures 2A, 2B, 2C:
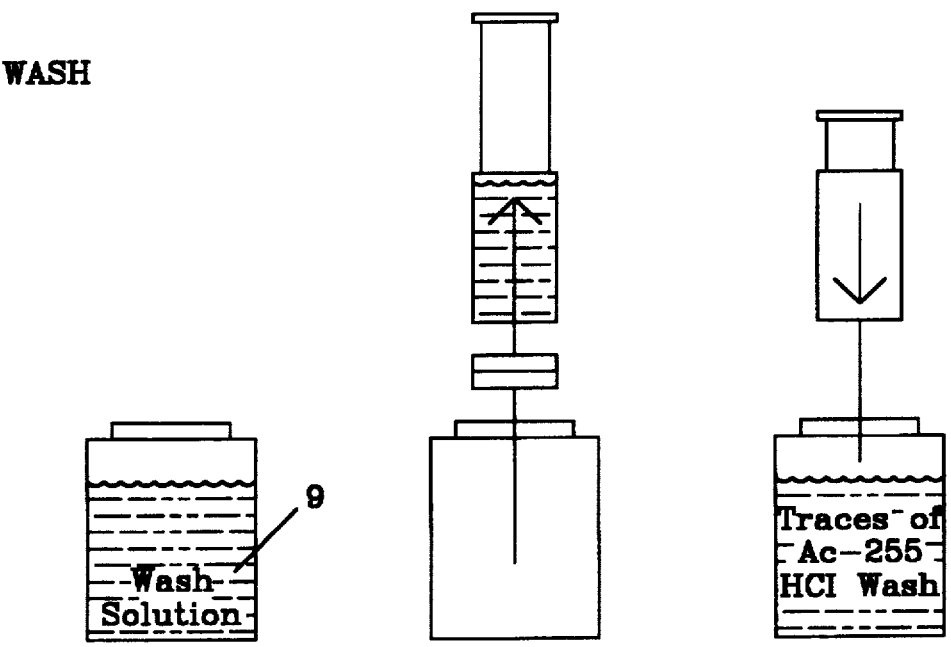
FIG. 2a illustrates the wash solution utilized in the preferred embodiment.
FIG. 2b illustrates the wash step of the preferred embodiment.
FIG. 2c illustrates the recovery of the wash solution as practiced in the preferred embodiment.

As illustrated in FIG. 2a, a wash solution 9 is then provided to accomplish the washing step of the preferred embodiment. The cartridge 1 containing the absorbed $^{213}$Bi on the resin 2 is again placed in line with the syringe 3. In the preferred embodiment of the present invention, as illustrated in FIG. 2b, a wash solution of 0.005M HCl 9 is drawn through the resin 2 to remove traces of $^{225}$Ac and HCl from the chloride complexed solution 4 which may be adhered to the interstitial surfaces of the resin 2. After the wash step, purified $^{213}$Bi is left attached to the resin 2. The cartridge 1 is again removed to allow the wash solution 9 to be ejected from the syringe 3 as illustrated in FIG. 2c. As will be apparent to those skilled in the art, it is not necessary that the chloride complexed solution 4 and the wash solution 9 be drawn through the resin 2 in the same direction, however, it is preferred that they be drawn in the same direction to maximize the $^{213}$Bi recovery.

Figure 3A:
FIG. 3a illustrates the elution solution utilized in the strip step of the preferred embodiment.
Figure 3B:
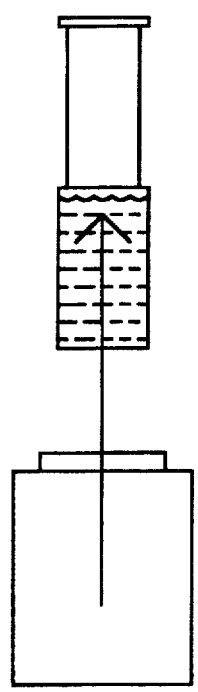
FIG. 3b illustrates the loading of the stripping solution in the strip step of the preferred embodiment.
Figure 3C:
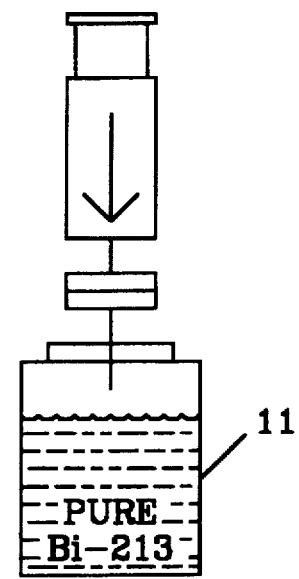
FIG. 3c illustrates the recovery of the $^{213}$Bi into the stripping solution in the strip step of the preferred embodiment.

As illustrated in FIG. 3a, a stripping solution 10 is then provided to accomplish the stripping step of the preferred embodiment. As illustrated in FIG. 3b, a stripping solution 10 selected as having a pH above about 2 and substantially free of Cl$^-$ ions is drawn through into the syringe 3 with the cartridge 2 removed. Once the syringe 3 is loaded with the stripping solution 10, the cartridge 1 containing the absorbed $^{213}$Bi on the resin 2 is again placed in line with the syringe 3. The stripping solution 10 is then pushed out of the syringe 3 through the resin 2 and into a recovery vessel 11. In this manner, the now purified $^{213}$Bi is removed from the resin 2. As illustrated by FIG. 3c, the purified $^{213}$Bi in the stripping solution 10 is thus available for further use. As will be apparent to those skilled in the art, it is not necessary that the stripping solution 10 be pushed through the resin 2 in a direction opposite to the direction which the chloride complexed solution 4 and the wash solution 9 were drawn, however, it is preferred that the stripping solution 10 be pushed in the opposite direction to maximize the $^{213}$Bi recovery. As will also be apparent to one skilled in the art, the relative direction of flow may also be reversed, however, the feed and wash should be sent through the web in one direction and the product eluted in the opposite direction. Preferable stripping solutions 10 include, but are not limited to, between about 0.01M and about 0.2M NaOAc. A preferable stripping solution is 0.05M NaOAc, pH 5.5; or NaOAc, pH 5.5, containing a suitable protein conjugated with bifunctional chelating agent (such as DTPA).

Experiment

A series of experiments were undertaken to demonstrate the efficacy of a preferred embodiment of the present invention. According to those experiments, the following procedure was followed. All acids, salts or bases used to "milk" $^{213}$Bi from the "Bi-Generator" were made up using "ULTR-EX™" purity or equivalent to eliminate cation impurities in the final $^{213}$Bi product.

Extraction Steps

1. Obtain the "Bi-generator" stored in a bottle or appropriate container. The radiochemical contents consist of $^{225}$Ac and daughters, taken to dryness in HCl to form a chloride salt for interim storage or off-site shipment.

2. Obtain a 3M anion exchange disc. Pre-treat the disk with 0.5M HCl by placing the acid in a syringe, locking or attaching the disc to the syringe, and by pushing down on the syringe plunger, forcing the acid through the membrane. Discard the pre-wash acid. This step insures that the anion resin is in the chloride form.

3. Take a known volume of 0.5M HCl into a pipettor.

4. Remove the screw lid from the "Bi-generator". Eject the HCl into the "cow" storage bottle allowing the $^{221}$Ac to dissolve in the solution.

5. Attach a pre-treated 3M filter to the syringe outlet and an appropriate plastic needle or tip to the outlet side of the 3M filter. With the same plastic tip or needle, pull the dissolved "cow" containing the $^{225}$Ac and its daughters (including $^{213}$Bi) up through the 3M anion exchange filter and up into the syringe barrel.

6. Remove the plastic tip or needle and remove the Bi-loaded 3M anion exchange disc and eject the $^{225}$Ac—0.5M HCl solution.

Wash Step

7. The $^{213}$Bi "product has now absorbed on to the anion exchange disc, along with minor traces of $^{225}$Ac and HCl (which adhere to the interstitial surfaces of the resin).

8. The used syringe and plastic needle or tip are replaced to eliminate any traces of $^{225}$Ac and acid. A new syringe is attached to the $^{213}$Bi 'loaded" anion exchange disc and a 0.005M HCl wash solution is pulled up through the disc. The disc is then removed and the acid wash, containing traces of interstitial "cow" solution, is expelled into a waste bottle. The "waste" HCl is discarded. Other acid concentrations (0.001–0.5M HCl) can be used. 0.005M HCl was selected because it provides an efficient wash without major loss of Bi product, while removing the 0.5M HCl which will interfere with the target pH value of 5.5 in the 0.05M NaOAc Product.

$^{213}$Bi Product Elution

9. The $^{213}$Bi "loaded" 3M disc, free of interstitial $^{225}$Ac and feed HCl, is eluted down-flow with one of several solutions of choice. This elution solution is placed in a clean syringe and forced through the $^{213}$Bi loaded disc and into a product bottle. (Optional) The above step can be repeated to obtain maximum product.

Summary of Selected Test Results $^{213}$Bi loading, washing and elution experiments were performed to determine, 1) maximum loading of $^{213}$Bi from a 0.5M HCl feed solution; 2) loss of Bi during anion exchange disc washing, to remove $^{225}$Ac contamination and to reduce the acid concentration; and 3) to develop the most efficient method to remove the purified Bi product with an elution solution that can then be used directly to allow final preparation and attachment of the monoclonal antibody.

The results (Table 1) show that, the $^{213}$Bi extraction and recovery generator system will recover 85 to 93% of the $^{213}$Bi in 0.05M NaOAc (pH 5.5), free of all other radionuclides. Although not shown, the entire extraction, wash and strip operation requires approximately six minutes. Three elutions of the bismuth from the "web" disc were performed per test to show the efficiency of the first "Product" elution. The second and third elutions recover an additional 4–7 % of the final product. Solutions suitable for removal of the $^{213}$Bi from the disc include: 1) 0.05M NaOAc; or, (1) NaOAc containing a suitable protein conjugated with bifunctional chelating agent (such as DTPA). The concentration of NaOAc may also be varied, i.e. 0.01–0.2M. The percent of $^{213}$Bi loaded and eluted with any of the above solutions is improved by loading only in one direction, washing in the same direction as the loading step, and eluting in the opposite direction from loading. The feed, wash and elution solutions were maintained at 4 milliliters for the initial investigation (based on 5 mCi per mL for a 20 mCi $^{225}$Ac "cow"). No attempt was made to optimize these volumes.

Extraction Step

Even though the anion exchange "system" is a paper thin sheet of organic ion exchange media, the initial "web" loading surface acts like the top of a standard ion exchange column and the back surface acts as the bottom of a top loading column. In addition, it should be recognized that the feed "cow" solution does not contain grams of bismuth to be loaded on to the exchanger, but only about $5.3 \times 10^{-8}$ mg Bi per millicurie ($^{221}$Ac "cows" from 1 to 20 mCi are proposed). Therefore, the loading experiments show that if the loading solution is pulled out of the generator storage container, up through the exchanger (up-flow) and then sent back to the bottle in the reverse direction that the loss of $^{213}$Bi to the effluent is 2–5% (13A and B). When the loading feed is passed only in one direction through the anion exchange media, the loss to the effluent is <0.1% (13C and D, 16A). The original two directional flow was conceived to permit the return of the $^{225}$Ac "cow" to the shielded container by the most expeditious route. However, when the feed flows through the "web", the Bi is absorbed on the front surface, but reversing the direction allows the "clean" 0.5M HCl to "kick" a small portion of the Bi off of the surface back into the original "generator" bottle.

Wash Step

The objective of the wash solution is to remove traces of residual feed solution that had not contacted the ion exchange media (to eliminate the interstitial $^{225}$Ac/Ra), and to reduce the acid concentration in the ion exchange media. The goal is to elute the $^{213}$Bi product at a pH (~5.5) required to link the $^{213}$Bi with a suitable protein conjugated with bifunctional chelating agent (such as DTPA). The wash solution combination of up-flow and down-flow gave $^{213}$Bi losses of ~3.6G (13A–D). When the wash solution was passed only in the opposite direction as the feed, the loss was 13–17 % (12C). When the wash solution was passed in the same direction as the feed flow, the wash loss was reduced to <1%. (16A).

Product Elution Step

Several types of eluants were tested including 0.05M NaOAc and 0.05M NaOAc+0.001M DTPA. They were selected based on known buffer solutions to be used with a suitable protein conjugated with bifunctional chelating agent (such as DTPA). No major differences were noted (13A, D and 13B, C).

TABLE 1

Experimental Results
Feed: 4 mL, 0.5M HCl, $^{225}$Ra/Ac and $^{213}$Bi
TD = Solution fed two directions (Up-flow/Down-flow)
UP = Up-flow only
DF = Down-flow only
% = $^{213}$Bi

| Test | Effluent | Scrub | Product #1 | Product #2 | Product #3 | Final Filter | Matl. Bal. |
|------|----------|-------|------------|------------|------------|--------------|------------|
|      |          |       | Elution: 0.05M NaOAc, pH 5.62 (initial) | | | | |
| 13A  | 4 mL     | 4 mL  | 4 mL       | 4 mL       | 4 mL       | 3.2%         | 90.5%      |
|      | 2.6%     | 3.2%  | 76.0%      | 4.0%       | 1.5% (81.5%) |            |            |
|      | TD       | TD    | DF         | DF         | DF         |              |            |
|      |          | FpH 1.63 | FpH 5.28 | FpH 5.54   | FpH 5.53   |              |            |

TABLE 1-continued

Experimental Results
Feed: 4 mL, 0.5M HCl, $^{225}$Ra/Ac and $^{213}$Bi
TD = Solution fed two directions (Up-flow/Down-flow)
UP = Up-flow only
DF = Down-flow only
% = $^{213}$Bi

| Test | Effluent | Scrub | Product #1 | Product #2 | Product #3 | Final Filter | Matl. Bal. |
|---|---|---|---|---|---|---|---|
| | | | Elution: 0.05M NaOAc, pH 5.62 (initial) | | | | |
| 13D | 4 mL<br>~0%<br>UF | 4 mL<br>3.6%<br>TD<br>FpH 1.58 | 4 mL<br>92.3%<br>DF<br>FpH 5.27 | 4 mL<br>4.5%<br>DF<br>FPH 5.54 | 4 mL<br>1.5% (98.3%)<br>DF<br>FpH 5.49 | 2.6% | 104.5% |
| | | | Elution: 0.05M NaOAc, pH 5.62 (initial) | | | | |
| 16A | 4 mL<br>~0%<br>UF | 4 mL<br>0.9%<br>UF<br>FpH 1.57 | 4 mL<br>84.0%<br>DF<br>FpH 5.27 | 4 mL<br>5.4%<br>DF<br>FpH 5.50 | 4 mL<br>2.0% (91.4%)<br>DF<br>FpH 5.41 | 7.7% | 100.0% |
| | | | Elution: 0.05M NaOAc + 0.001M DTPA, pH 5.62 (initial) | | | | |
| 13B | 4 mL<br>2.9%<br>TD | 4 mL<br>3.4%<br>TD<br>FpH 1.57 | 4 mL<br>83.5%<br>DF<br>FpH 5.23 | 4 mL<br>4.2%<br>DF<br>FpH 5.40 | 4 mL<br>1.2 (88.9%)<br>DF<br>FpH 5.54 | 2.9% | 98.1% |
| | | | Elution: 0.05M NaOAc + 0.001M DTPA, pH 5.62 (initiaL) | | | | |
| 13C | 4 mL<br>~0%<br>UF | 4 mL<br>4.3%<br>TD<br>FpH 1.38 | 4 mL<br>89.0%<br>DF<br>FPH 5.27 | 4 mL<br>4.0%<br>DF<br>FpH 5.48 | 4 mL<br>1.3% (94.3%)<br>DF<br>FpH 5.48 | 4.4% | 103.0% |
| | | | Elution: 0.05M NaOAc, pH 5.62 (initial) | | | | |
| 12C | 4 mL<br>4.8%<br>TD | 4 mL<br>13.5%<br>DF<br>FpH 1.83 | 4 mL<br>69.2%<br>DF<br>FpH 5.49 | 4 mL<br>4.6%<br>DF<br>FpH 5.67 | 4 mL<br>2.0% (71.8%)<br>DF<br>FpH 5.58 | ~3.5% | 97.6% |
| | | | Elution: 0.05M NaOAc, pH 5.62 (initial) | | | | |
| 12D | 4 mL<br>1.85%<br>TD | 4 mL<br>17.3%<br>DF<br>F pH Not Det. | 1 mL<br>38.2%<br>DF | 1 mL<br>11.8%<br>DF | 1 mL<br>5.6% (58.9%)<br>DF | 21.3% | 99.35% |
| | | | Elution: 0.05M NaOAc, pH 5.62 (initial) | | | | |
| 11A | 4 mL<br>3.8%<br>TD | 4 mL<br>3.5%<br>TD<br>FpH 1.67 | 4 mL<br>64.7%<br>TD<br>FpH 5.50 | 4 mL<br>11.6%<br>TD<br>FpH 5.61 | 4 mL<br>3.6% (79.9%)<br>TD<br>FpH 5.61 | Not Det. | — |
| | | | Elution: 0.05M NaOAc, pH 5.62 (initial) | | | | |
| 11B | 4 mL<br>4.8%<br>TD | 4 mL<br>3.0%<br>TD<br>FpH Not Det. | 4 mL<br>56.0%<br>TD(3-times) | 4 mL<br>9.1%<br>TD | 4 mL<br>4.3% (69.4%)<br>TD | Not Det. | — |
| | | | Elution: 0.05M NaOAc + 0.1M NaCl, pH 5.58 (initial) | | | | |
| 12A | 4 mL<br>1.79%<br>TD | 4 mL<br>3.7%<br>TD<br>FpH 1.72 | 4 mL<br>57.9%<br>TD<br>FpH 5.50 | 4 mL<br>13.4%<br>TD<br>FpH 5.51 | 4 mL<br>5.5% (76.8%)<br>TD<br>FpH 5.50 | 17.8% | ~100% |
| | | | Elution: H$_2$O | | | | |
| 12B | 4 mL<br>4.7%<br>TD | 4 mL<br>4.6%<br>TD<br>FpH 1.77 | 4 mL<br>36.2%<br>TD<br>FpH 3.04 | 4 mL<br>32.1%<br>TD<br>FpH 4.87 | 4 mL<br>5.8% (74.1%)<br>TD<br>FpH 6.66 | ~16.5% | ~100% |
| | | | Elution: 0.1M NaOAc, pH 5.68 (initial) | | | | |
| 11C | 4 mL<br>3.3%<br>TD | 4 mL<br>3.3%<br>TD<br>FpH Not Det. | 4 mL<br>67.0%<br>TD | 4 mL<br>8.9%<br>TD | 4 mL<br>3.3% (80.6%)<br>TD | Not Det. | — |

While a preferred embodiment of the present invention has been shown and described, it will be apparent to those skilled in the art that many changes and modifications may be made without departing from the invention in its broader aspects. The appended claims are therefore intended to cover all such changes and modifications as fall within the true spirit and scope of the invention.

We claim:

1. A method for separating $^{213}$Bi from a solution of radionuclides comprising the following steps:
   (a) ensuring the solution of radionuclides containing $^{213}$Bi further contains HCl at a concentration which allows the formation of a chloride complex,
   (b) exposing the solution to an anionic exchange resin, thereby absorbing the $^{213}$Bi from the solution as an anionic complex and adhering the $^{213}$Bi in the anionic complex to the resin,
   (c) separating the resin with the adhered $^{213}$Bi in the anionic complex from the solution, and
   (d) exposing the resin and the adhered $^{213}$Bi in the anionic complex to a stripping solution thereby removing the $^{213}$Bi from the resin and transferring the $^{213}$Bi into said stripping solution.

2. The method of claim 1 wherein said stripping solution is selected from the group comprising water, complexants, and sodium acetate and combinations thereof.

3. The method of claim 1 wherein said stripping solution is selected as having a pH greater than 2.

4. The method of claim 1 wherein said stripping solution contains proteins conjugated with bifunctional chelating agents.

5. The method of claim 1 wherein said anionic exchange resin is provided in a thin film.

6. The method of claim 5 wherein said a thin film is provided as polytrifluoroethylene.

7. The method of claim 1 further comprising the step of washing the anionic exchange resin prior to providing the stripping solution.

* * * * *

UNITED STATES PATENT AND TRADEMARK OFFICE
CERTIFICATE OF CORRECTION

PATENT NO. : 5,749,042
DATED : May 5, 1998
INVENTOR(S) : Lane Allan Bray and Jaquetta R. DesChane It is certified that error appears in the above-identified patent and that said Letters Patent is hereby corrected as shown below:

In column 4, line 32, after the word "absorbed" please delete the word --the--.

In column 8, line 38, please replace "~3.6G" with --~3.6%--.

Signed and Sealed this

Twenty-fifth Day of May, 1999

Attest:

Q. TODD DICKINSON

*Attesting Officer*       *Acting Commissioner of Patents and Trademarks*